3,092,448
PROCESS FOR SEPARATING NIOBIUM AND TANTALUM
John H. Kennedy, Claymont, Del., assignor to E. I. du Pont de Nemours and Company, Wilmington, Del., a corporation of Delaware
No Drawing. Filed Aug. 31, 1960, Ser. No. 53,050
5 Claims. (Cl. 23—15)

This invention concerns a process for separating niobium and tantalum. More particularly, this invention relates to a chemical processing technique for the separation of niobium and tantalum values from each other, based upon their precipitation as mixed alkali metal niobate and tantalate compounds.

In the past, techniques employed for the separation of niobium and tantalum had as their primary objective the provision of pure tantalum compounds. More recently, the preparation of high purity niobium compounds has become equally important. Various techniques for preparing pure niobium compounds have been proposed and have met with varying degrees of success. For the most part, however, the procedures are cumbersome and costly. For instance, a typical procedure for recovering niobium from mother liquors after tantalum processing, involves the following steps: partial hydrolysis of the mother liquor repeatedly with potassium carbonate to remove tantalum traces; precipitation of niobium as sodium niobate; dissolution of sodium niobate; reprecipitation of niobium as niobic acid; dissolution of niobic acid as potassium niobate; fractional crystallization to remove impurities such as titanium; and finally, acid precipitation of relatively pure niobic acid. This procedure, even though employed on a commercial scale, is long and tedious, and recovery is low.

It is an object of this invention, therefore, to provide a novel process for separating niobium and tantalum values especially useful for the recovery of pure niobium compounds. It is a further object of the invention to provide a process for separating niobium and tantalum which is convenient and economical to perform. It is another object to provide novel mixed alkali metal niobate and tantalate compounds. It is still another object of this invention to provide relatively pure niobium compounds. Other and additional objects will appear hereinafter.

These objects are accomplished in accordance with this invention by preparing a niobate-tantalate solution containing hydroxide ion in a concentration of at least 0.01 molar; adding sodium ion and potassium ion to said solution in a concentration greater than that stoichiometrically required for the formation of a compound of the formula:

$$Na_4K_4Nb_6O_{19} \cdot nH_2O$$

wherein $n$ is the degree of hydration, the potassium ion constituting at least 50 mole percent of the total concentration of sodium ion and postassium ion. The tetrasodium tetrapotassium hexaniobate compound preferenially crystallizes from the solution. The tantalum values may be recovered by treating the mother liquors with additional sodium ion which facilitates the separation of the mixed alkali metal tantalate. Each of the niobium and antalum fractions may be further purified by repeating he procedure until products of the desired purity are obtained.

The niobate-tantalate mixtures directly applicable to he separation process of this invention, contain niobium nd tantalum in solution as the hexa-aggregated species represented by the formula $[M_6O_{19}]^{8-}$. Other niobium-tantalum mixtures are readily utilized, however, since they may conveniently be converted to solutions containing these species by known techniques. The most expedient technique involves treating a niobium-tantalum mixture with an aqueous solution of a strong base such as potassium hydroxide. If such treatment is inadequate, more drastic treatment, such as fusion with potassium hydroxide, may be employed. The separation process is applicable not only to synthetic niobium-tantalum mixtures but is even adaptable to the extraction of niobium and tantalum from ores, to the up-grading of niobium-tantalum ore concentrates, to the recovery of niobium from tantalum tailings, and the like.

These novel mixed alkali metal niobate and tantalate compounds of this invention have the formulae $$Na_4K_4Nb_6O_{19} \cdot nH_2O$$

and $Na_3K_5Ta_6O_{19} \cdot nH_2O$, wherein $n$ is the degree of hydration. Generally, the value of $n$ will be between about 5 and 15 with values of 9, 10 and 13 for the niobate being particularly preferred for their rate of precipitation from niobate-tantalate solutions.

The mixed alkali metal niobate and tantalate compounds contain sodium and potassium ions in stoichiometric ratios. Unlike most niobium and tantalum compounds, the niobate of this invention is the less soluble and precipitates first from the niobate-tantalate mixtures.

The details of the invention are illustrated in the examples, in which the quantities are given as parts by weight unless otherwise designated, and in the discussion which follows.

EXAMPLE I

A synthetic sample containing 2 parts of sodium potassium niobate and 2 parts of sodium potassium tantalate in 200 parts of hot water is added to a solution containing 238 parts of 6 molar potassium hydroxide and 52 parts of 1 molar sodium hydroxide. The mixture is allowed to stand without further heating, and after 30 minutes the crystalline material is filtered off. To the filtrate is added 121 parts of 6 molar sodium hydroxide, and the mixture is allowed to stand overnight. The crystals which separate out are removed by filtration.

Each of the crystalline fractions is washed well with alcohol, dried and analyzed for niobium content. Fraction I (1.06 parts) contains 0.78 part (73.6%) of niobate, and fraction II (2.4 parts) contains 0.28 part of niobate. A colorimetric method is employed for the analysis of niobium in the presence of tantalum. The method is accurate within ±2%. A total of 82% of the niobium and 93% of the tantalum is recovered from the original mixture.

EXAMPLE II

The procedure of Example I is followed except that the following quantities are employed. A solution containing 2 parts of the niobate and 2 parts of the tantalate in 100 parts of water is added to a solution containing 94 parts of 6 molar potassium hydroxide and 31 parts of 6 molar sodium hydroxide. The first crystalline fraction (2.8 parts) contains 1.58 parts (62.8%) of niobate. The second fraction, obtained by adding 121 parts of 6 molar sodium hydroxide to the mother liquor, contains 0.08 part of niobate. Total niobate recovery is 83% and tantalate recovery is 99%.

EXAMPLE III

The procedure of Example I is followed except that the following quantities are employed. A solution containing 4 parts of niobate and 1 part of tantalate in 200 parts of water is added to a solution containing 52 parts of 6 molar sodium hydroxide and 252 parts of 6 molar potassium hydroxide. The first crystalline fraction (4.3 parts) contains 3.64 parts (84.6%) of niobate. The second fraction (0.6 part), obtained by adding 121 parts of 6 molar sodium hydroxide to the mother liquor, contains 0.22 part of niobate. This represents a 96.5% recovery of niobium and a 100% recovery of tantalum.

EXAMPLE IV

A mixture containing 5 parts of sodium potassium niobate and 5 parts of sodium potassium tantalate in 500 parts of water is heated to 70° C. and added to a mixture containing 630 parts of 6 molar potassium hydroxide and 70 parts of 6 molar sodium hydroxide. The mixture is filtered after 15 minutes. The crystalline product (A) is dissolved in 500 ml. of water, heated to 80° C. and added to a mixture containing 630 parts of 6 molar potassium hydroxide and 70 parts of 6 molar sodium hydroxide. The mixture is filtered after 20 minutes. The crystalline product (B) is treated as was product A, and product (C) is collected. The results of the recrystallization on the product compositions are tabulated below.

Percent Nb(as $Na_4K_4Nb_6O_{19}$)
Starting mixture _____ 50
Product A _____ 57
Product B _____ 72
Product C _____ 86

The application of the separation process to the upgrading and recovery of niobium from ores and ore concentrates is demonstrated in the examples which follow.

EXAMPLE V

A sample of Nigerian columbite (10 parts) is fused with 20 parts of potassium hydroxide for 30 minutes. The melt is cooled and treated with 208 parts of boiling 1 molar potassium hydroxide solution. The mixture is filtered while hot, and 119 parts of 5 molar sodium hydroxide is added to the filtrate. Tan crystals identified as a mixture containing sodium niobate and tantalate precipitate out. The crystals are dissolved in 50 ml. of water and 50 ml. of a 12:1 mixture of potassium hydroxide and sodium hydroxide (OH=5 molar) are added and the mixture is allowed to cool. The crystalline sodium-potassium niobate is filtered off and washed successively with ice water, acetone and ether. A portion of the crystalline product is dissolved in water and acidified with hydrochloric acid, precipitating niobic acid, which is removed by filtration and ignited to niobium pentoxide. Comparison of the purity of the starting ore concentrate, the sodium potassium niobate product and the niobium pentoxide ignition product are shown in Table I. The recovery of niobium from the ore is about 80%.

EXAMPLE VI

The procedure of Example V is followed except that a sample of N. V. Billiton pyrochlore ore is substituted for the Nigerian columbite. The analyses of the starting ore concentrate, the sodium potassium niobate product and the niobium pentoxide ignition product are tabulated in Table II. The recovery of niobium from the ore is quantitative.

EXAMPLE VII

The procedure of Example I is applied to the sodium potassium niobate product obtained in Example VI, and the first crystalline fraction obtained is analyzed by emission spectrography for titanium and tantalum content. The titanium impurity is reduced by a factor of 4 in one fractionation. The tantalum analysis, because of sensitivity limitations of the spectrographic technique, is inconclusive.

*Table I*

*Emission Spectrographic Analyses—Example V, Percentage Found*

| Element | Nigerian Columbite Ore | Na-K Niobate | $Nb_2O_5$ Ignition Product |
|---|---|---|---|
| Fe | 0.1–1.0 | 0.05–0.25 | 0.05–0.25. |
| Pb | 0.08–0.5 | not detected | not detected. |
| Sn | 0.1–1.0 | not detected | not detected. |
| Mg | 0.005–0.025 | 0.0005–0.0025 | 0.005–0.020. |
| Mn | 0.1–1.0 | 0.01–0.05 | 0.03–0.15. |
| Si | 0.02–0.1 | 0.03–0.15 | 0.02–0.10. |
| Cu | 0.01–0.05 | 0.02–0.10 | 0.02–0.10. |
| Al | 0.1–1.0 | 0.005–0.020 | 0.005–0.020. |
| Ta | 0.2–2.0 | 1–5 | 1–5. |
| Ti | 0.5–5.0 | 0.1–1.0 | 0.1–1.0. |
| Ca | 0.005–0.025 | 0.02–0.10 | 0.005–0.020. |
| Na | 0.002–0.01 | 3–15 | 0.1–1.0. |
| Ba | 0.01–0.05 | not detected | not detected. |
| Sr | 1.0–10 | not detected | not detected. |
| K |  | 3–15 | 0.5–2.0. |
| Zn | 0.05–0.25 | not detected | not detected. |
| Ag | 0.002–0.01 | 0.001–0.005 | 0.001–0.005. |

*Table II*

*Emission Spectrographic Analyses—Example VI, Percentage Found*

| Element | Pyrochlore Ore | Na-K Niobate | $Nb_2O_5$ Ignition Product |
|---|---|---|---|
| Fe | 0.1–1.0 | 0.03–0.15 | 0.05–0.25. |
| Pb | 0.08–0.5 | not detected | not detected. |
| Sn | 0.1–1.0 | not detected | not detected. |
| Mg | 0.005–0.025 | 0.0005–0.0025 | 0.0005–0.0025. |
| Mn | 0.05–0.25 | 0.005–0.025 | 0.005–0.025. |
| Si | 0.1–1.0 | 0.03–0.15 | 0.02–0.10. |
| Cu | 0.005–0.025 | 0.01–0.05 | 0.02–0.10. |
| Al | 0.1–1.0 | not detected | not detected. |
| Ta | 0.1–1.0 | 0.08–0.5 | 0.1–1.0. |
| Ti | 0.5–5.0 | 0.1–1.0 | 0.1–1.0. |
| Ca | 0.1–1.0 | 0.03–0.15 | 0.005–0.020. |
| Na | 0.03–0.15 | 3–15 | 0.1–1.0. |
| Ba | 3–15 | not detected | not detected. |
| Sr | 5–25 | not detected | not detected. |
| K | 0.1–1 | 3–15 | 0.1–1.0. |
| Ag |  | 0.001–0.005 | 0.0005–0.0025. |

EXAMPLE VIII

A solution, prepared by mixing 2 parts of sodium potassium niobate (9-hydrate), 10 parts of 3 molar potassium hydroxide and 10 parts of 1 molar sodium chloride and diluting to a total volume of 100 parts, deposits crystals of the mixed alkali metal salt within less than 5 minutes. A solution of 2 parts of the sodium potassium niobate (9-hydrate) in 100 parts of water is stable for long periods, no crystals being detected in such solutions even after six months.

The foregoing examples illustrate a new process useful for the separation of niobium and tantalum from each other and for the extraction and up-grading of niobium ores and ore concentrates. The process involves the formation of the novel compounds, sodium potassium hexaniobate, $Na_4K_4Nb_6O_{19}$, and sodium potassium hexatantalate, $Na_3K_5Ta_6O_{19}$, in alkaline aqueous solution, whereby the niobate salt is less soluble and preferentially crystallizes from solution.

The direct recovery of niobium-tantalum values by the process of the present invention is achieved from aqueous solutions containing the aforementioned metals as oxyanionic species, such as simple niobate, pentaniobate, hexaniobate, and other anions derived from the various niobic acids. Therefore, any niobium-tantalum mixture which may be converted by known technique to niobate and tantalate species, for instance by fusion with potassium hydroxide, is a suitable starting material. These include such materials as ores, ore tailings, or concentrates, alloy scraps, miscellaneous mixtures resulting from various processing, and the like.

For the successful operation of the separation process the crystallization solutions are adjusted to contain a least 0.01 molar free hydroxide ion, usually employing potassium hydroxide. The niobium and tantalum oxy anions are then in the form of hexaniobate and hexatantalate. However, higher hydroxide ion concentrations have no adverse effects on the process, which has been found operative even when the hydroxide ion concentration becomes as high as 10 molar. The operability of the process over such a wide range of base concentrations is especially advantageous when the process is applied to ores which have been fused with hydroxide. The leaches can be diluted a minimum amount, thus avoiding the need to handle very large volumes of liquid. The preferred hydroxide concentrates are within the range, 3–5 molar.

The crystallization mixtures preferably contain at least 0.01 molar excesses of sodium ion and potassium ion over that required by stoichiometry to convert the hexaniobate and hexatantalate therein to the mixed alkali metal salts, $Na_4K_4Nb_6O_{19} \cdot nH_2O$ and $Na_3K_5Ta_6O_{19} \cdot nH_2O$. However, the operating procedure is not impaired when either is employed in a large excess within the limitations set forth below. This factor is also especially advantageous when the technique is applied to ores; if fusion is carried out with potassium hydroxide, no additional step is required for reducing the concentration of potassium ion in the leach solution.

The relative concentration of sodium ion and potassium ion, with respect to their total concentration in the crystallization solutions, is critical for the success of the separation process. Of the total concentration of sodium ion and potassium ion, the latter should constitute at least about 50 mole percent for the mixed salts to form. Solutions containing 60 to 98 mole percent of potassium ion provide especially favorable crystallization media and are preferred. Both the sodium ion and potassium ion may be introduced into the mixtures as salts, such as the chlorides, nitrates and the like, or as hydroxides. It is preferred to employ the hydroxides, however, since products with higher over-all purities are obtained. It is advantageous in most situations that the sodium ion and potassium ion be added simultaneously to the niobate-tantalate mixtures or that the addition of sodium ion follows the addition of potassium ion. Either of these procedures will prevent the precipitation of sodium tantalate or niobate. However, in the situations where the solutions are hot or very dilute, the order of addition is less important.

Recovery of tantalum-rich fractions from the mother liquors, after the preferential crystallization of the sodium-potassium niobate, is facilitated by adding large excesses of sodium ion. This may be as a sodium salt, sodium hydroxide, mixtures thereof, and the like. It appears that the increase in sodium ion concentration increases the rate of formation of the mixed sodium-potassium tantalate to the extent that the crystallization occurs within a reasonable period of time. Conventional procedures for recovering the tantalum may be employed, however, if desired. The preferred procedure for the over-all process includes the accelerated crystallization of sodium-potassium tantalate by the addition of excess sodium ion, as hereinbefore described.

The temperature at which the separation process is carried out is not critical to the invention and may vary over a wide range. Temperatures giving optimum separation over a relatively short period of time, for instance, separation of niobate fractions after about 30 minutes, are in the range of 50 to 100° C. when suitable concentrations of hydroxide ion, sodium ion and potassium ion are chosen; that is, for solution 3–5 molar in hydroxide ion, having sodium ion and potassium ion in such concentrations that the potassium ion makes up about 60 to 98 mole percent of the total sodium and potassium ion concentration. It will be obvious to one skilled in the art that large variations in one of the variables will necessitate adjustments in the others, however, to maintain a convenient working range of crystallization conditions.

In order to effect further purification of the niobate and tantalate crystalline fractions, the procedure of the separation process is repeated. For example, the niobium-rich fraction is dissolved in an aqueous solution at least 0.01 molar in hydroxide, and potassium and sodium ion is added in accordance with the aforesaid conditions. After two-to-four recrystallizations, essentially pure niobium compounds are obtained.

In the situation where niobium and tantalum values are recovered from ores and other materials containing many extraneous impurities, it is often desirable first to upgrade the source material by removing the niobium and tantalum together as the sodium-potassium salts, a simple alkali metal salt, such as the sodium salt, or the like in one crystallization and then to apply the fractionation procedure for their separation. This modification is within the scope of this invention and its application has been illustrated in Examples V and VI.

The particular advantage of the novel process herein described for the separation of niobium values from impurities such as tantalum, is that the sodium-potassium hexaniobate, unlike most niobium salts, is less soluble than the corresponding tantalate and crystallizes first from niobium-containing mixtures. It is an additional advantage that titanium, often a troublesome impurity in conventional processing, does not appear to concentrate with the niobium, and that which is carried along is readily removed when the fractionation procedure is repeated. Economically, this process offers the advantage of using inexpensive materials, and reagents such as hydrofluoric acid, which is costly and especially inconvenient to handle are avoided.

The process has been described in detail in the foregoing specification. It will be obvious that many modifications may be made without departing from the spirit and scope of the invention. I intend, therefore, to be bound only by the following claims.

I claim:
1. The process for separating niobium and tantalum from each other which comprises preparing a niobate-tantalate solution containing hydroxide ion in a concentration of at least about 0.01 molar; adding sodium ion and potassium ion to said solution in a concentration sufficient to provide a molar ratio of combined sodium and potassium to niobium of greater than 8 to 6, the potassium ion constituting at least about 50 mol percent of the total concentration of sodium ion and potassium ion, whereby mixed alkali metal niobate crystallizes from solution.

2. The process of claim 1 wherein the potassium ion concentration is between about 60 and 98 mole percent of the total sodium and potassium ion concentration.

3. The process for separating niobium and tantalum values from a composition containing both values comprising fusing said composition with potassium hydroxide; extracting the fusion mass with potassium hydroxide solution; crystallizing the niobium and tantalum together as alkali metal salts by addition of sodium hydroxide; and dissolving the niobium-tantalum crystalline mixture in an aqueous solution containing at least 0.01 molar potassium hydroxide.

4. The process of claim 1 wherein the sodium-potassium hexaniobate is separated from the mother liquor, tantalum values being recovered from said mother liquor by increasing the concentration of sodium ion, whereby sodium-potassium hexatantalate.

5. The process of claim 1 wherein said hydroxide ion concentration is between about 3 and about 5 molar.

References Cited in the file of this patent

UNITED STATES PATENTS

| | | |
|---|---|---|
| 2,758,008 | Reisman et al. | Aug. 7, 1956 |
| 2,976,246 | Egerton et al. | Mar. 21, 1961 |

OTHER REFERENCES

Mellor: "Comprehensive Treatise on Inorganic and Theoretical Chemistry," Longmans, Green and Co., N.Y., 1929, vol. 9, pages 843 and 845; 864, 865, 901 and 102.

UNITED STATES PATENT OFFICE
CERTIFICATE OF CORRECTION

Patent No. 3,092,448 June 4, 1963

John H. Kennedy

It is hereby certified that error appears in the above numbered patent requiring correction and that the said Letters Patent should read as corrected below.

Column 6, line 62, after "hexatantalate" insert -- crystallizes from solution --.

Signed and sealed this 10th day of December 1963.

(SEAL)
Attest:

ERNEST W. SWIDER
Attesting Officer

EDWIN L. REYNOLDS
Acting Commissioner of Patents